(12) United States Patent
Li et al.

(10) Patent No.: US 9,461,469 B2
(45) Date of Patent: Oct. 4, 2016

(54) ELECTRICAL POWER GRID FOR A DOWNHOLE BHA

(71) Applicant: Schlumberger Technology Corporation, Sugar Land, TX (US)

(72) Inventors: Fei Li, Gloucestershire (GB); Tamir El-Halawani, Gloucestershire (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 616 days.

(21) Appl. No.: 13/906,362

(22) Filed: May 31, 2013

(65) Prior Publication Data

US 2014/0354081 A1   Dec. 4, 2014

(51) Int. Cl.
*H02J 3/12* (2006.01)
*E21B 41/00* (2006.01)

(52) U.S. Cl.
CPC ............. *H02J 3/12* (2013.01); *E21B 41/0085* (2013.01); *Y10T 307/832* (2015.04)

(58) Field of Classification Search
CPC .................................................. E21B 41/0085
USPC ........................................................ 307/126
See application file for complete search history.

(56) References Cited

U.S. PATENT DOCUMENTS

| | | | |
|---|---|---|---|
| 7,074,064 B2 | 7/2006 | Wallace | |
| 8,264,369 B2 | 9/2012 | Hall et al. | |
| 2003/0085816 A1 | 5/2003 | Baird et al. | |
| 2006/0100968 A1* | 5/2006 | Hall | E21B 41/0085 705/400 |
| 2006/0162934 A1 | 7/2006 | Shepler | |
| 2006/0191687 A1 | 8/2006 | Storm et al. | |
| 2007/0194947 A1* | 8/2007 | Huang | E21B 47/14 340/854.3 |
| 2007/0194948 A1* | 8/2007 | Hall | E21B 17/003 340/854.8 |
| 2009/0302691 A1* | 12/2009 | Wang | H02J 3/38 307/129 |
| 2012/0146415 A1 | 6/2012 | Simsek et al. | |

OTHER PUBLICATIONS

International search report and written opinion for the equivalent PCT patent application No. PCT/US2014/036784 issued on Sep. 16, 2014.

* cited by examiner

*Primary Examiner* — Rexford Barnie
*Assistant Examiner* — Daniel Kessie
(74) *Attorney, Agent, or Firm* — John Vereb

(57) ABSTRACT

A downhole electrical power grid electrically connects a string of downhole tools including at least a first power generating tool and a second power consuming tool. The power generating tool includes a power generator, an electric load, and a power management controller. The power management controller is configured to automatically electrically connect and disconnect the tool from the power grid. The power generating tool may include a rotary steerable tool having a power generator, an electric actuator, and the aforementioned power management controller.

12 Claims, 4 Drawing Sheets

ELECTRICAL POWER GRID FOR A DOWNHOLE BHA

FIELD

Disclosed embodiments relate generally to a downhole electrical power grid and more particularly to a downhole electrical power grid in which surplus power from one tool is provided to other tools in the grid.

BACKGROUND INFORMATION

The use of electrically powered sensors, control modules, and motors is ubiquitous in downhole drilling tools. These tools may include, for example, rotary steerable drilling tools, measurement while drilling (MWD) tools, logging while drilling (LWD) tools, and the like. Such downhole tools are generally equipped with a power source such as a power generating turbine or a battery pack. Batteries are inherently power limited such that the operational capacity of a battery powered tool may be limited by the life of the battery. Batteries may also occupy several feet of tool space thereby increasing the length of the bottom hole assembly (BHA) which in turn moves tool segments further away from the drill bit than may be optimal. Downhole turbines are limited in that they only provide power when drilling fluid is circulating through the drill string.

Some downhole tools have been configured to receive electrical power from a power generating sub via a hard wired connection. For example, in a commercial system available from Schlumberger, MWD and LWD tools may receive low-voltage DC power from a low-voltage tool bus (LTB) via a hard wire connection with an MWD power generating sub. U.S. Patent Publication 2012/0146415 discloses a power allocation methodology among downhole tools receiving power from a LTB. While such a methodology has proven to be commercially viable strictly allocate power via sequencing and other techniques indicate that the LTB lacks available power.

SUMMARY

An electrical power grid for a downhole BHA is disclosed. The electrical power grid electrically connects a string of downhole tools including at least a first power generating tool (e.g., a rotary steerable drilling tool) and a second power consuming tool (e.g., a MWD or LWD tool). The power generating tool includes a power generator, an electric load, such as an actuator or a motor, and a power management controller. The power management controller is configured to electrically connect and disconnect the tool from the power grid. The power generating tool may be connected to the power grid, for example, when surplus electrical power is available in the tool and disconnected when there is no surplus power available. The power consuming tool may also include a power management controller as well as an electric load, such as sensors, circuits and/or actuators. The power consuming tool may optionally be connected to the power grid so as to consume power from the grid and may be disconnected from the grid when the tool does not require an external power.

The electrical power grid may alternatively connect a string of downhole tools including at least first and second downhole tools that both generate and consume electrical power. Each of the tools includes a power generator and a power management controller. The power management controller selectively electrically connects and disconnects the corresponding tool from the power grid.

A disclosed rotary steerable tool includes an electrical power generator, an electric actuator, and a power management controller including a switch to automatically electrically connect and disconnect the rotary steerable drilling tool from a power grid such that the rotary steerable drilling tool is connected to the power grid when surplus electrical power is available in the rotary steerable drilling tool.

The disclosed embodiments may provide various technical advantages. For example, disclosed embodiments enable surplus electrical power available in one downhole tool to be utilized in another tool (via transmission through the power grid). Such power sharing may prolong battery life in tools that make use of battery power in that these tools may be configured to draw battery power in instances when grid power is unavailable. The disclosed embodiments may thus further increase the service life and improve downhole tool functionality of various battery powered tools. Moreover, the disclosed embodiments may enable smaller battery packs to be utilized, thereby conserving valuable downhole real estate.

The disclosed embodiments may also reduce the capacity of the power generation module and/or battery supply for each downhole tool in the power grid when the grid is capable of providing sufficient power. Furthermore, the reliability of the power generating tool may be improved since surplus power may no longer need to be dissipated via heat (which can cause electronic circuits in the tool to suffer higher temperature stress). Moreover, the power grid and surplus power recycling allows more integrated and simple BHA design.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
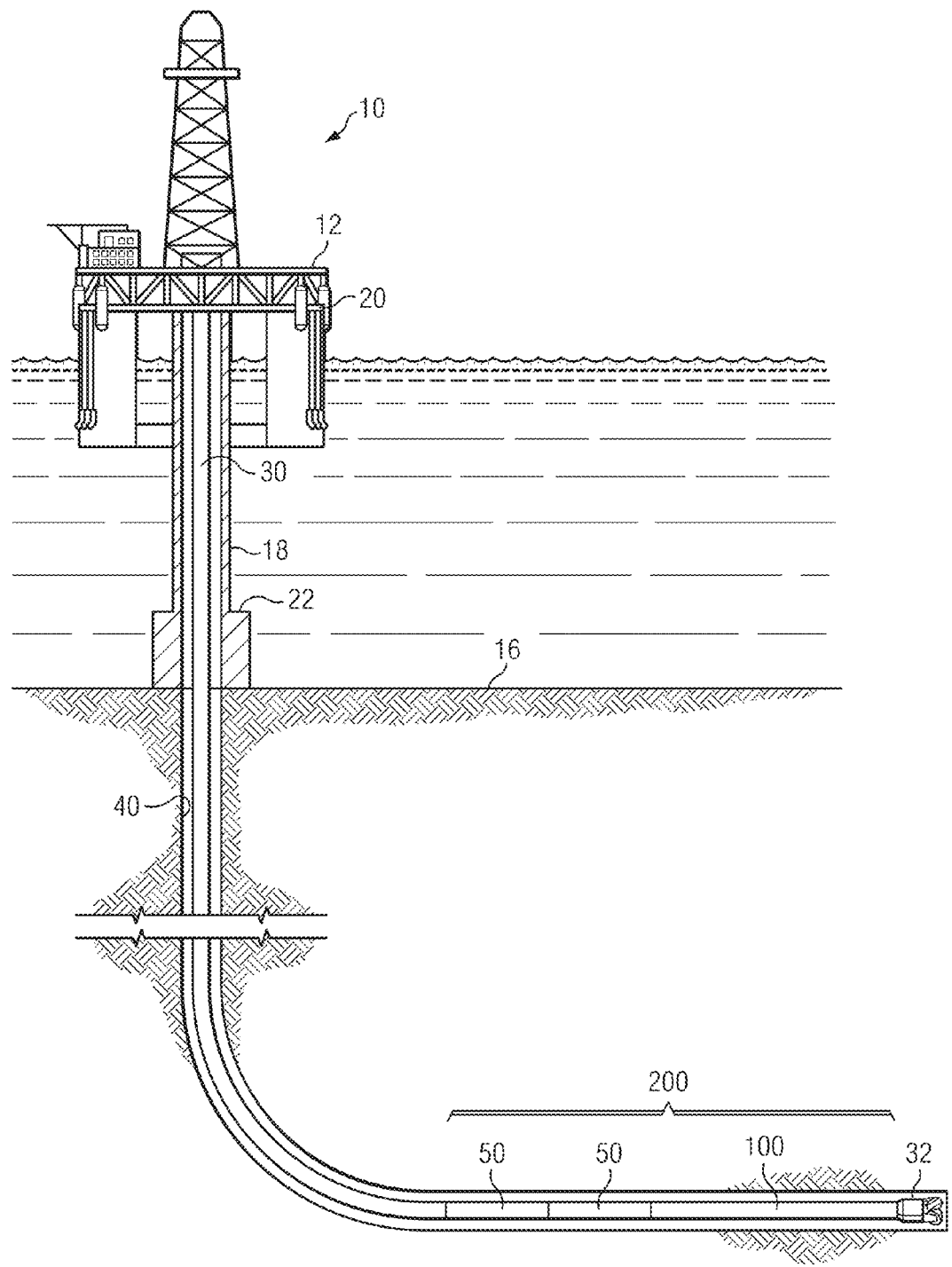
FIG. 1 depicts one example of a rig on which a downhole power grid may be employed.

FIG. 1 depicts an example drilling rig 10 suitable for employing a bottom hole assembly (BHA) having a downhole power grid as disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into the borehole 40 and includes a BHA having a downhole power grid 200 with multiple electrically connected tools deployed above a drill bit 32. In the depicted embodiment, the string of tools that make up the power grid 200 includes a power generating downhole tool such as a rotary steerable drilling tool 100 configured to provide electrical power to the grid 200 and one or more power consuming tools such as MWD and/or LWD tools 50 configured to obtain electrical power from the grid 200.

It will be understood that the deployment illustrated on FIG. 1 is merely an example and that that the drill string 30 may include substantially any suitable downhole tool components, for example, including reamers, stabilizers, formation fluid sampling tools, a downhole telemetry system, and the like. The disclosed embodiments are by no means limited to any particular drill string or coiled tubing configuration. It will be further understood that disclosed embodiments are not limited to use with a semisubmersible platform 12 as illustrated on FIG. 1. The disclosed embodiments are equally well suited for use with either onshore or offshore subterranean operations.

Figure 2:
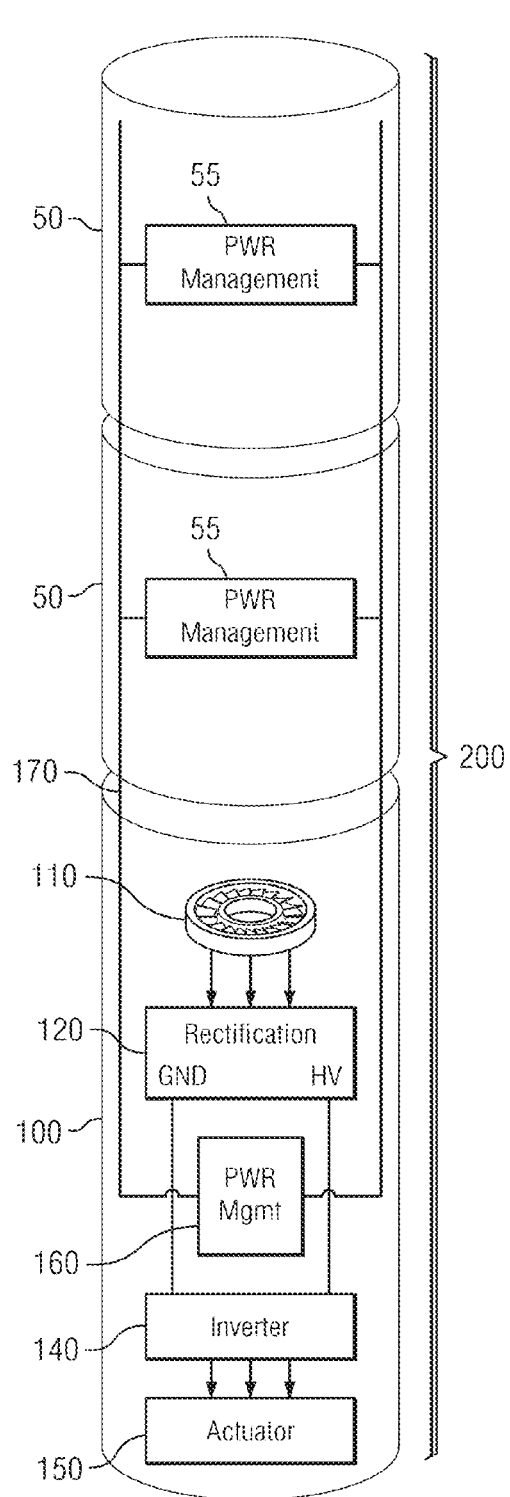
FIG. 2 depicts a downhole power grid employing a hard wire connection between a plurality of tools.

FIG. 2 depicts a downhole power grid 200 employing a hard wire connection 170 for electrically connecting a plurality of downhole tools. In the depicted embodiment, the BHA includes a rotary steerable tool 100 configured to both generate and consume electrical power and first and second MWD and/or LWD tools 50 including power management modules 55 that may be configured to generate and/or consume electrical power. The MWD and/or LWD tools 50 may include, for example, a battery pack that acts as a primary (or secondary) power source for powering various electrical and electronic components in the tool (e.g., controllers, sensors, solenoids, etc). The tools 50 may also consume electrical power from the grid 200 when battery power is insufficient or otherwise unavailable or when power is available on the grid. The MWD and/or LWD tools 50 may also be configured to provide power to the grid if surplus power is available.

As is known to those of ordinary skill in the art, downhole tools are commonly threaded together (end to end) to produce a tool string. While such threaded connections are not shown on FIG. 2, they are well understood in the art. In the depicted embodiment, the electrical wires making up the hard wire connection 170 may be routed through the threaded connections or extenders or may be incorporated into the threads to provide electrical communication between adjacent tools (e.g., between the rotary steerable tool 100 and MWD and/or LWD tools 50). The disclosed embodiments are not limited to any particular apparatus or mechanism for providing the hard wired connection between various tools in the grid 200. Various means for routing electrical wires through threaded connections are known in the art. For example, U.S. Pat. No. 7,074,064 to Wallace discloses an electrical connector configured for routing a plurality of power lines between downhole tools.

With continued reference to FIG. 2, the rotary steerable drilling tool 100 includes a drilling fluid flow-driven turbine generator 110 configured to generate three-phase AC power (e.g., with a power generation capacity of hundreds or even thousands watts). A rectifier 120 converts (rectifies) the AC power to DC power on a voltage bus 130 (FIG. 3) where it may be used for many functions (e.g., to power electronic controller(s) and various electronic components, sensors, memory, and the like). The DC power is inverted by a full bridge inverter 140 to AC power for driving one or more electrical motors 150 (actuators). As is known to those of ordinary skill in the art the motors 150 may be used to actuate various components in the tool 100 thereby providing steering functionality (the use of electrical motors in rotary steerable systems is described in more detail below).

Figure 3:
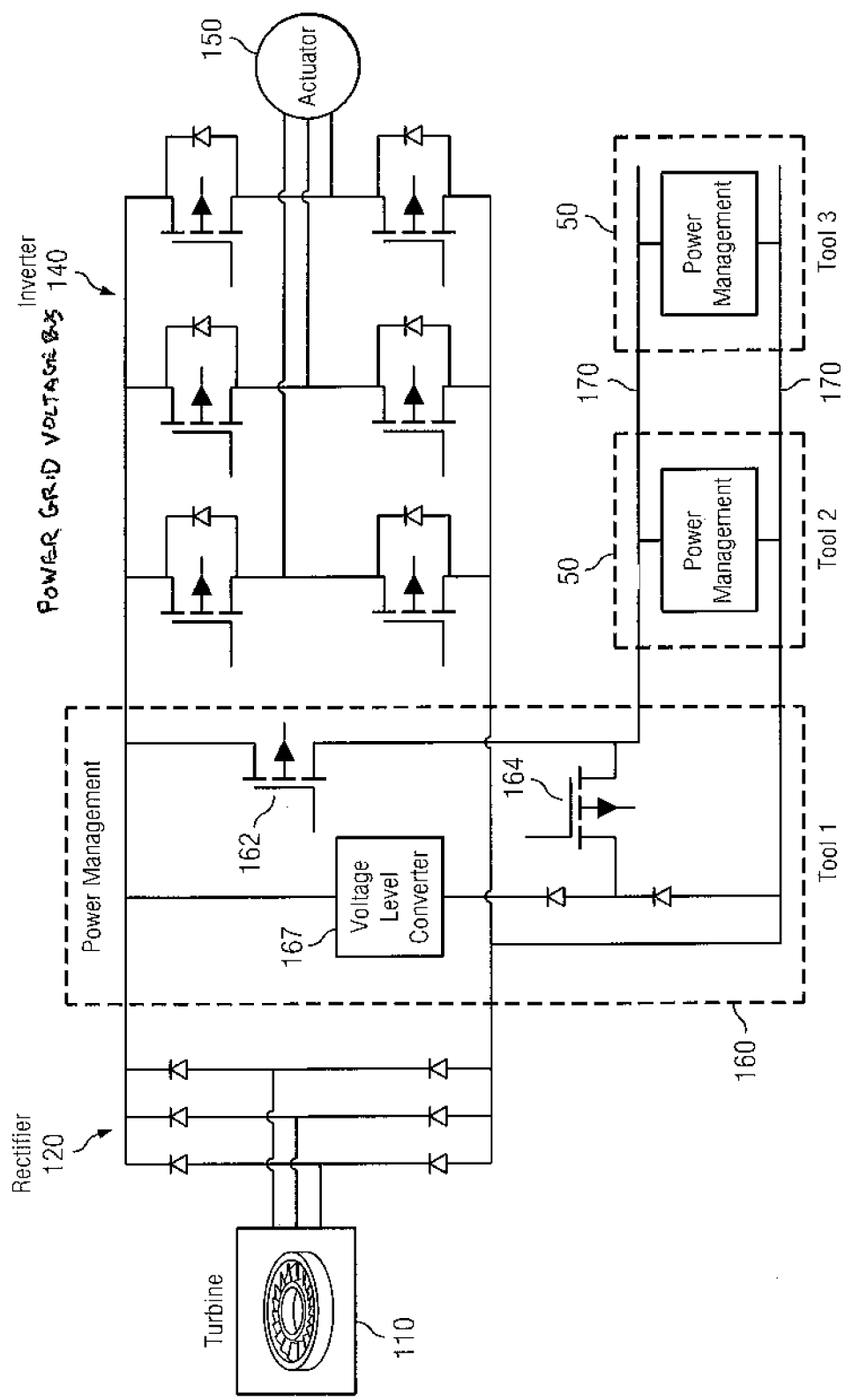
FIG. 3 depicts one embodiment of an electrical circuit diagram of the power grid depicted on FIG. 2.

Rotary steerable tool 100 further includes a power management controller 160 in electrical communication with the tool voltage bus 130 (FIG. 3). As described in more detail below with respect to FIG. 3, the controller 160 is configured to provide surplus power to the downhole power grid 200, for example, via providing an electrical connection (e.g., via closing a switch) between the rotary steerable tool voltage bus 130 and the power grid 200 to provide surplus power to the grid (when it is available) and disconnecting the voltage bus (e.g., via opening a switch) from the power grid 200 when no surplus power is available.

FIG. 3 depicts a simplified schematic of one embodiment of an electrical circuit diagram of the power grid depicted on FIG. 2. As described above, three phase AC power is generated by a flow-driven turbine generator 110. The AC power is rectified via rectifier 120 to DC power on voltage bus 130. While not depicted, various electronic components (e.g., controllers and sensors) may be electrically connected to the voltage bus 130 so as to draw DC power. The DC power from the bus is also inverted by a full bridge inverter 140 to AC power for driving at least one electric motor 150. The power management controller 160 is configured to manage the flow of electrical power between the rotary steerable tool and grid 200 (e.g., between tool bus 130 and grid 200).

In the depicted embodiment the power management controller includes a switch 162 configured to control the power transmission from the voltage bus 130 to the grid 200. The switch 162 may include an integrated circuit switch, for example, including a MOSFET switch. When the switch 162 is closed the tool bus 130 is electrically connected with the grid 200 and supplies electrical power to the grid. When the switch 162 is opened the tool bus 130 is electrically disconnected from the grid 200 thereby electrically isolating the rotary steerable tool 100 from the grid 200. MWD and/or LWD tools 50 may provide their own power (e.g., via local battery packs) or receive power from the grid via an alternative power supply when the rotary steerable tool 100 is disconnected from the grid 200.

In embodiments in which the power grid includes an alternative power source (e.g., in one of the other tools deployed on the grid 200), it may be desirable for the tool bus 130 to be electrically connected to the grid 200 in such a way that the grid 200 may also supply electrical power to the tool bus 130. In such embodiments, the power management controller 160 may include first and second switches 162 and 164 configured to connect and disconnect the voltage bus 130 from the grid 200. The switches 162 and 164 may include integrated circuit switches, for example, including MOSFET switches. When the switch 164 is closed the grid 200 is electrically connected with the tool bus 130 such that the tool bus 130 receives electrical power form the grid 200, e.g., via a one-phase rectification (2-diode bridge) and a voltage 167 converter. When the switch 164 is opened the grid 200 is electrically disconnected from tool bus 130 thereby electrically isolating the rotary steerable tool 100 from the grid 200.

The power management controller 160 may thereby allow the tool to operate in one of the following three operational modes: (i) a power supplying mode in which electrical power is provided to the grid 200 via closing switch 162 and opening switch 164 when the tool has surplus power available; (ii) a power consuming mode in which electrical power is obtained from the grid 200 via opening switch 162 and closing switch 164 when the tool calls for electrical power; or (iii) an independent mode in which the tool is electrically disconnected from grid 200 and operates independently via opening both switches 162 and 164. The tool may be configured to switch automatically between the three modes, for example, based on a tool bus voltage level (or some other indicator). Moreover, the power management controller may further include a programmable controller (sometimes referred to in the art as an intelligent controller) such as a central processing unit (CPU) or a digital signal processor (DSP) to control the opening and closing of the aforementioned switches 162 and 164. It will be understood that any one or more of the rotary steerable tool 100 and the MWD and/or LWD tools 50 may include a power management controller to manage their power provision and consumption to and from the grid 200.

The power control strategy may be based, for example, on the voltage level on the tool bus 130. When the voltage level is higher than some nominal operating bus voltage (i.e., greater than some predetermined value), surplus power may be available. Thus, with respect to the circuit embodiment depicted on FIG. 3, the first switch 162 may be configured to close when the voltage level on the tool bus 130 exceeds a first predetermined operating value (thereby connecting the tool bus 130 with the grid 200 such that power is provided to the grid). When the voltage level is less than the first predetermined operating value, the first switch 162 may be configured to open thereby electrically isolating the tool bus 130 from the grid 200. The second switch 164 may be configured to close when the voltage level on the tool bus 130 drops below a second predetermined operating value (thereby connecting the tool bus 130 with the grid 200 such that power is received from the grid). When the voltage level is greater than the second predetermined operating value, the second switch 164 may be configured to open thereby electrically isolating the tool bus 130 from the grid 200. It will be understood that in embodiments in which the second predetermined operating is less than the first predetermined operating value there may be a voltage window in which the tool bus 130 neither provides nor receives electrical power to or from the grid.

It will be understood that surplus power may be provided to the tool bus 130 from numerous sources. For example, surplus power may be provided to the tool bus 130 when the electric motor(s) 150 and other tool electronics consume less power than that generated by the turbine generator 110. Additionally, surplus power may be provided to the tool bus 130 by the electric motor(s) when they decelerate, brake, and/or operate in the reverse direction. Such surplus power increases the voltage level on the bus as described above and may be made available to the grid.

It will be understood that the power management controller 160 may further include various means of storing electrical power. For example, although not depicted, the power management controller may further include capacitor banks or even rechargeable batteries for storing surplus electrical power. Moreover, the power management controller 160 may include further circuitry configured to dissipate surplus power on the tool bus 130 (or the grid 200) through a load resistor in the event that the power consumption of the tools connected to the grid 200 is less than the power generated by the turbine generator 110. For example, the power management controller 160 may include a third switch configured to close when the bus voltage exceeds a third predetermined value indicative of surplus power on the grid 200 (closing the third switch being operative to dissi- pate power through the aforementioned load resistor) to stabilize the voltage level on the grid.

Figure 4:
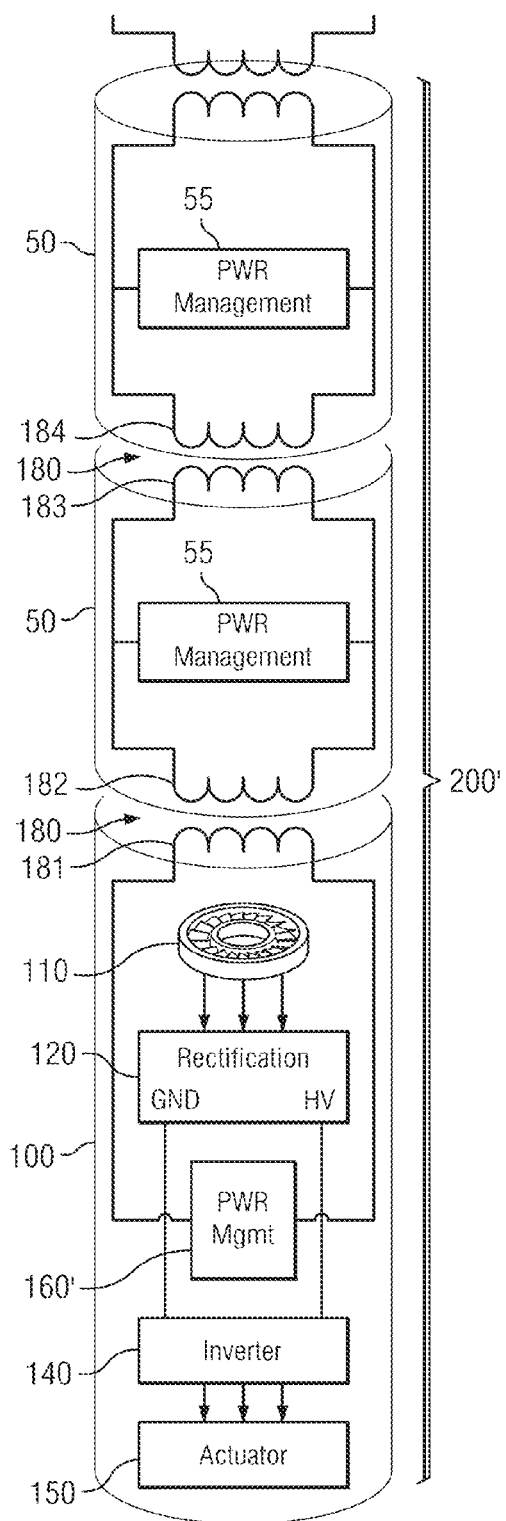
FIG. 4 depicts a downhole power grid employing an inductive coupling between a plurality of tools.

FIG. 4 depicts a downhole power grid 200' employing inductive couplings 180 for electrically connecting adjacent downhole tools. Power grid 200' is similar to power grid 200 (shown on FIG. 2) in that it includes a rotary steerable tool 100 configured to both generate and consume electrical power and first and second MWD and/or LWD tools 50 including power management modules 55 that may be configured to generate and/or consume electrical power. The primary distinction between power grid 200' and power grid 200 is that the electrical power is transmitted between the downhole tools via the inductive couplings 180 in power grid 200'. Thus power grid 200 may be thought of as being a DC power grid while power grid 200' may be thought of as being an AC power grid (however it will be understood that the hard wired power grid 200 may also transmit AC power). The power management controller in the rotary steerable tool 100 may be readily adapted to accommodate an AC power grid as described in more detail below. The power management modules in the MWD and/or LWD tools 50 may also be readily adapted to accommodate an AC power grid, for example, including rectifier circuitry for converting the AC power to DC power.

Figure 5:
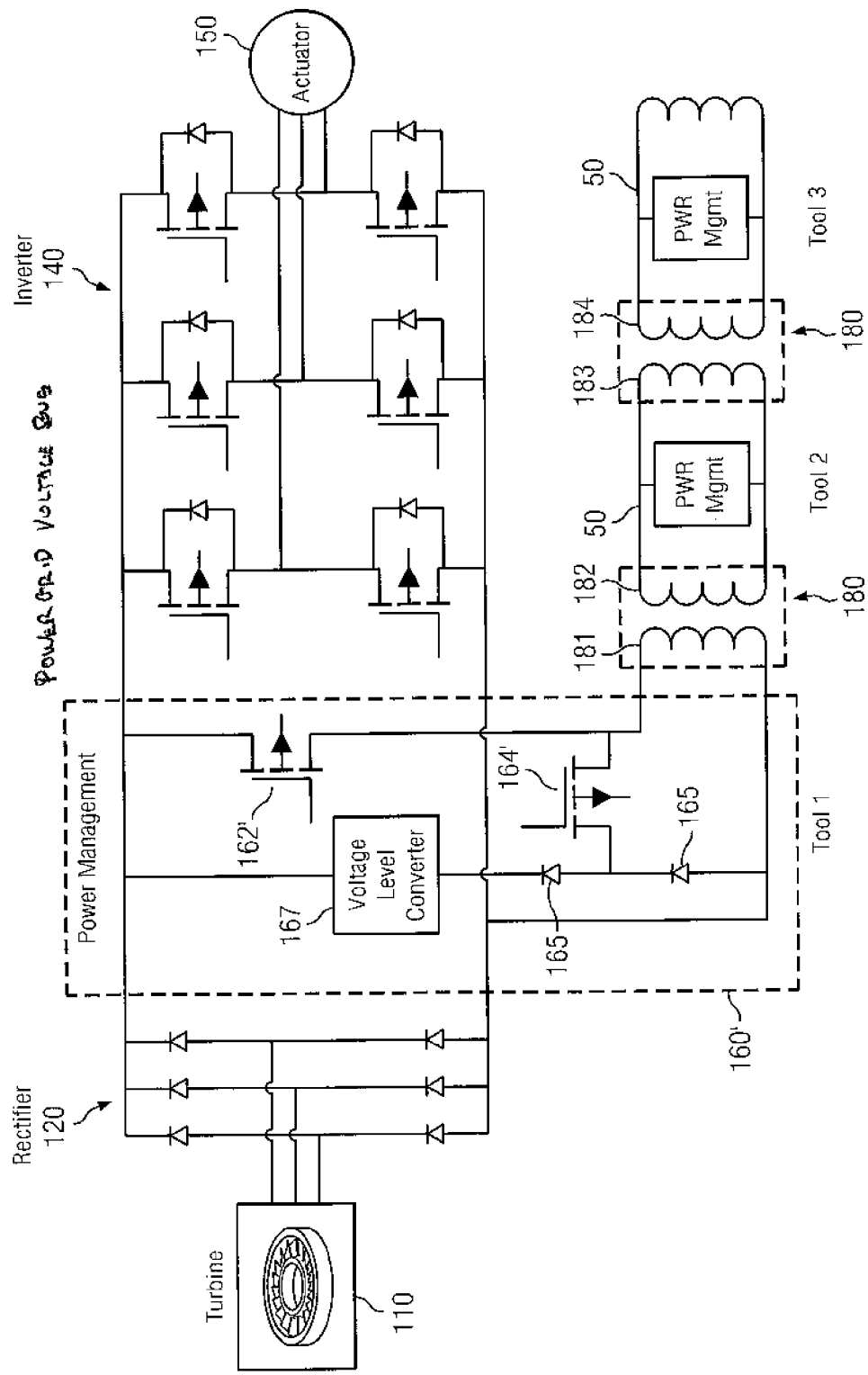
FIG. 5 depicts one embodiment of an electrical circuit diagram of the power grid depicted on FIG. 4.

FIG. 5 depicts a simplified schematic of one embodiment of an electrical circuit diagram of the AC power grid depicted on FIG. 4. The depicted circuit diagram is similar to that depicted on FIG. 2 in that it includes flow driven turbine generator 110 electrically connected with a rectifier 120 that provides DC power to voltage bus 130. A full bridge inverter 140 converts the DC bus power to AC power for driving at least one electric motor 150. The electrical circuit differs from that depicted on FIG. 2 in that the power management controller 160' is configured to convert DC power from the voltage bus 130 to AC power for transmission to the grid 200'.

Power management controller 160' is similar to power management controller 160 depicted on FIG. 3 in that it includes first and second switches 162' and 164' configured to connect and disconnect the voltage bus 130 from the grid 200'. When the first switch 162' is closed and the second switch 164' is opened the tool bus 130 is electrically connected with the grid 200' such that it supplies electrical power to the grid 200'. When the first switch 162' is opened and the second switch 164' is closed the tool bus 130 is electrically connected with the grid 200' such that it receives electrical power from the grid 200'. When both switches 162' and 164' are opened the tool bus 130 is electrically disconnected from the grid 200' thereby electrically isolating the rotary steerable tool 100.

Power management controller 160' differs from power management controller 160 in that switch 162' is configured to convert DC power on the voltage bus 130 to AC power. This may be accomplished, for example, via controlling the switch frequency (i.e., rapidly opening and closing the switch at some predetermined frequency to provide approximately square wave AC power to the grid 200'). Power management controller 160' may further include rectifying circuitry (e.g., diodes 165) and a voltage level converter 167 in electrical communication with switch 164' for converting AC power on the grid 200' to DC power having a suitable voltage.

With continued reference to FIGS. 4 and 5 the inductive couplings 180 employ inductive coils deployed in adjacent dill string components. For example, in the depicted embodiment inductive coil 181 on the rotary steerable tool 100 is in communication with inductive coil 182 on MWD and/or LWD tool 50. Likewise, the MWD and/or LWD tools 50 are in communication via inductive coils 183 and 184. It will be understood that grid 200' may include substantially any suitable number of downhole tools electrically connected by inductive couplings 180.

As described above, inductive coil 181 may be energized by power management controller 160' (with power from the tool bus 130), thus inducing a magnetic field about the coil 181. The magnetic field in turn induces an AC current in coil 182 thereby providing electrical power to the MWD and/or LWD tool 50. Inductive coil 183 is in electrical communication with and thus receives AC current from inductive coil 182. A magnetic field is induced about coil 183 which in turn induces an AC current in coil 184. Adjacent inductive coils may have the same number of windings, or may have different numbers of windings and function as step up or step down transformers to accommodate the voltage draws of various drill string components or to allow power transfer over larger distances with less power loss. The downhole tools in the grid 200' may include various rectifying and filtering circuitry for converting the AC power to DC power suitable for power electronics and other instruments.

It will be understood that the inductive couplings 180 may be deployed, for example, in the threaded connections between the various drill string components (e.g., between steering tool 100 and MWD and/or LWD tool 50). The disclosed embodiments are not limited to any particular inductive coupling and/or threaded connection configuration. Suitable inductive coupling embodiments are disclosed, for example, in U.S. Pat. No. 8,264,369 to Hall et al, which is incorporated by reference herein in its entirety.

With continued reference to FIGS. 2-5 it will be understood that the disclosed embodiments are not limited to any particular steering tool configuration. For example, substantially any suitable rotary steerable tool may be utilized. Non-limiting examples of suitable rotary steerable tools include the PowerDrive® rotary steerable systems (available from Schlumberger). These include the PowerDrive® X5 and X6 rotary steerable systems that make use of actuated blades (or pads) that contact the borehole wall. The extension of the blades (or pads) is rapidly and continually adjusted as the system rotates in the borehole. The PowerDrive® Xceed® makes use of an internal steering mechanism which enables the tool body to fully rotate with the drill string. The PowerDrive® Archer® makes use of a lower steering section joined at a swivel with an upper section. The swivel is actively tilted via pistons so as to change the angle of the lower section with respect to the upper section and maintain a desired drilling direction as the bottom hole assembly rotates in the borehole. These systems may include power generating capability (e.g., a flow driven turbine as described above) and electrical motors configured to actuate various steering functionality.

It will be further understood that the disclosed embodiments are not limited to any particular MWD and/or LWD tool configuration. Substantially any suitable MWD and/or LWD tool may be connected to the downhole power grid. Non limiting examples of suitable MWD tools may include navigational sensors including gyroscopic sensors, accelerometers, and/or magnetometers. Suitable MWD tools may further include ultrasonic and/or physical caliper sensors. Suitable LWD tools may include substantially any suitable logging sensor, for example, including formation fluid evaluation sensors, acoustic sensors, gamma ray sensors, neutron sensors, density sensors, porosity sensors, photoelectric sensors, magnetic resonance sensors, resistivity sensors, formation pressure sensors, annular pressure sensors, and the like. The MWD and/or LWD tools may further include a telemetry system for transmitting data to the surface while drilling.

It will be still further understood that the disclosed downhole power grid embodiments may include substantially any power consuming and/or power generating downhole tools. Moreover, while the grids 200 and 200' depicted on FIGS. 2-5 each include three electrically connected downhole tools, it will be understood that the disclosed embodiments may include substantially any suitable number of electrically interconnected downhole tools.

Although an electrical power grid for a downhole BHA has been described in detail, it should be understood that various changes, substitutions and alternations can be made herein without departing from the spirit and scope of the disclosure as defined by the appended claims.

What is claimed is:

1. A string of downhole tools comprising:
an electrical power grid electrically connecting at least a first power generating tool and a second power consuming tool in the string; and
the power generating tool including a power generator, an electric load, and a power management controller, the power management controller configured to automatically selectively electrically connect and disconnect the power generating tool to and from the power grid,
wherein the power management controller is configured to connect a tool bus on the power generating tool to the power grid when a DC voltage level on the tool bus is greater than a predetermined value;
wherein the power management controller comprises an integrated circuit switch configured to close when the DC voltage level on the tool bus is greater than the predetermined value and open when the DC voltage level on the tool bus is less than the predetermined value;
wherein the power management controller comprises an integrated circuit switch configured to repeatedly open and close at a predetermined frequency when the DC voltage level on the tool bus is greater than the predetermined value and open when the DC voltage level on the tool bus is less than the predetermined value, said repeated opening and closing operative to provide AC power to the power grid.

2. The string of tools of claim 1, wherein the power management controller is configured to connect the power generating tool to the power grid when the power generating tool has surplus electrical power available.

3. The string of tools of claim 1, wherein the power generating tool and the power consuming tool are connected via a hardwired electrical connection.

4. The string of tools of claim 1, wherein the power generating tool and the power consuming tool are connected via an inductive coupling.

5. The string of tools of claim 1, wherein the power generating tool comprises a rotary steerable drilling tool and the power generator comprises a drilling fluid flow-driven turbine.

6. The string of tools of claim 1, wherein the string comprises a plurality of power generating tools, each of which includes a power generator, an electric load, and a power management controller configured to selectively electrically connect and disconnect the corresponding power generating tool to and from the power grid.

7. The string of tools of claim 1, wherein the string comprises a plurality of power consuming tools, each of which includes an electric load and a power management controller configured to selectively electrically connect and disconnect the corresponding power consuming tool to and from the power grid.

8. The string of tools of claim 1, wherein the power generating tool further comprises a rectifier and an inverter, the rectifier being configured to convert AC power produced by the power generator to DC power on a tool bus, the inverter being configured to convert DC power on the tool bus to AC power for an electric actuator, the power management controller configured to connect the tool bus to the power grid when surplus electrical power is available on the tool bus.

9. A string of downhole tools comprising:
an electrical power grid electrically connecting at least first and second downhole tools in the string, each of which generates an consumes electrical power; and
each of the tools including a power management controller, the power management controller configured to automatically selectively electrically connect and disconnect the corresponding tool to and from the power grid wherein the power management controller is configured to connect a corresponding tool to the power grid (i) when a DC voltage level on a tool bus is greater than a first predetermined value or (ii) when the DC voltage level on the tool bus is less than a second predetermined value;
wherein: the power management controller comprises first and second integrated circuit switches:
the first switch being configured to close when the DC voltage level on the tool bus is greater than the first predetermined value and open when the DC voltage level on the tool bus is less than the first predetermined value; and
the second switch being configured to close when the DC voltage level on the tool bus is less than the second predetermined value and open when the DC voltage level on the tool bus is greater than the second predetermined value
wherein: the power management controller comprises first and second integrated circuit switches;
the first switch configured to repeatedly open and close at a predetermined frequency when the DC voltage level on the tool bus is greater than the predetermined value and open when the DC voltage level on the tool bus is greater than the predetermined value and open when the DC voltage level on the tool bus is less than the predetermined value, and repeated opening and closing operative to provide AC power to the power grid; and
the second switch being configured to close when the DC voltage on the tool bus is less than the second predetermined value and open when the DC voltage level on the tool bus is greater than the second predetermined value and
wherein the power management controller further comprises rectifying circuitry configured to rectify AC power on the power grid to DC power on the tool bus when the second switch is closed.

10. The string of tools of claim 9, wherein the power management controller is configured to connect the corresponding tool to the power grid (i) when surplus electrical power is available in the tool so as to provide electrical power to the power grid or (ii) when insufficient electrical power is available in the tool so as to obtain electrical power from the grid.

11. The string of tools of claim 9, wherein the first and second downhole tools are connected via a hardwired electrical connection.

12. The string of tools of claim 9, wherein the first and second downhole tools are connected via an inductive coupling.

* * * * *